US011950059B2

(12) United States Patent
Polinske et al.

(10) Patent No.: US 11,950,059 B2
(45) Date of Patent: Apr. 2, 2024

(54) ANTENNA STRUCTURE FOR HEARING DEVICES

(71) Applicant: Starkey Laboratories, Inc., Eden Prairie, MN (US)

(72) Inventors: Beau Jay Polinske, Minneapolis, MN (US); Deepak Hosadurga, Bloomington, MN (US); Randy Kannas, Minneapolis, MN (US); Zhenchao Yang, Eden Prairie, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 0 days.

(21) Appl. No.: 18/178,365

(22) Filed: Mar. 3, 2023

(65) Prior Publication Data

US 2023/0209285 A1 Jun. 29, 2023

Related U.S. Application Data

(63) Continuation of application No. 17/658,144, filed on Apr. 6, 2022, now Pat. No. 11,601,767, which is a (Continued)

(51) Int. Cl.
*H04R 25/00* (2006.01)

(52) U.S. Cl.
CPC ......... *H04R 25/609* (2019.05); *H04R 25/554* (2013.01); *H04R 25/602* (2013.01); *H04R 2225/025* (2013.01); *H04R 2225/51* (2013.01)

(58) Field of Classification Search
CPC .. H04R 25/554; H04R 25/558; H04R 25/552; H04R 25/00; H04R 2225/021; H04R 2225/51
See application file for complete search history.

(56) References Cited

U.S. PATENT DOCUMENTS 7,742,614 B2 6/2010 Christensen et al.
8,401,211 B2 * 3/2013 Angst .................. H04R 25/556 381/23.1

(Continued)

FOREIGN PATENT DOCUMENTS

DE 202014000874 U1 3/2014
EP 2546926 A1 1/2013

(Continued)

OTHER PUBLICATIONS

Communication pursuant to Article 94(3) EPC from counterpart European Application No. 17199024.5 dated Mar. 23, 2023, 4 pp.

(Continued)

*Primary Examiner* — Amir H Etesam
(74) *Attorney, Agent, or Firm* — Shumaker & Sieffert, P.A.

(57) ABSTRACT

A hearing device includes an enclosure comprising a shell and a faceplate and is configured for at least partial insertion within an ear of a user. An antenna structure of the hearing device is oriented such that a direction of an electric field (E-field) of a propagating electromagnetic signal generated by the antenna structure is directed non-tangentially with respect to the user at the location of the user's ear. The antenna structure includes an antenna disposed in or on the faceplate and a ground plane at least partially supported by the faceplate. A battery and electronic circuitry are disposed within the shell. The electronic circuitry is powered by the battery and is electrically coupled to send and/or receive signals via the antenna structure.

17 Claims, 7 Drawing Sheets

Related U.S. Application Data continuation of application No. 16/675,691, filed on Nov. 6, 2019, now Pat. No. 11,323,833, which is a continuation of application No. 15/336,532, filed on Oct. 27, 2016, now Pat. No. 10,477,329.

(56) References Cited

U.S. PATENT DOCUMENTS

| | | | |
|---|---|---|---|
| 9,554,219 | B2 | 1/2017 | Kvist |
| 9,729,979 | B2 | 8/2017 | Ozden |
| 10,149,073 | B2 | 12/2018 | Polinske et al. |
| 10,477,329 | B2 | 11/2019 | Polinske et al. |
| 11,323,833 | B2 | 5/2022 | Polinske et al. |
| 2003/0151557 | A1 | 8/2003 | Johnson |
| 2010/0158295 | A1 | 6/2010 | Polinske |
| 2010/0171667 | A1 | 7/2010 | Knudsen |
| 2012/0087506 | A1 | 4/2012 | Ozden |
| 2012/0154244 | A1 | 6/2012 | Baliarda |
| 2013/0017786 | A1 | 1/2013 | Kvist et al. |
| 2013/0087506 | A1 | 4/2013 | Danov et al. |
| 2013/0342407 | A1 | 12/2013 | Kvist |
| 2014/0023216 | A1 | 1/2014 | Solum et al. |
| 2014/0226844 | A1 | 8/2014 | Kerselaers |
| 2016/0049074 | A1 | 2/2016 | Shennib |
| 2016/0050502 | A1 | 2/2016 | Kvist et al. |
| 2016/0381470 | A1 | 12/2016 | Henriksen |
| 2016/0381471 | A1 | 12/2016 | Henriksen et al. |
| 2022/0303699 | A1 | 9/2022 | Polinske et al. |

FOREIGN PATENT DOCUMENTS

| | | | |
|---|---|---|---|
| EP | 2680366 | A1 | 1/2014 |
| WO | 2005081583 | A1 | 9/2005 |

OTHER PUBLICATIONS

Response to Communication pursuant to Article 94(3) EPC dated Mar. 23, 2023, from counterpart European Application No. 17199024.5 filed Jul. 18, 2023, 36 pp.

Conway et al., "Antennas for Over-Body-Surface Communications at 2.45 GHz", IEEE Transactions on Antennas and Propagation, vol. 57, No. 4, Apr. 2009, pp. 844-855.

Knapp et al., "The Generalized Correlation Method for Estimation of Time Delay", IEEE Transactions on Acoustics, Speech, and Signal Processing, vol. ASSP. 24, No. 4, Aug. 1976, pp. 320-327.

Prosecution History from U.S. Appl. No. 15/336,532, dated Jun. 14, 2018 through Jul. 9, 2019, 98 pp.

Prosecution History from U.S. Appl. No. 16/675,691, dated Feb. 19, 2021 through Mar. 25, 2022, 47 pp.

Prosecution History from U.S. Appl. No. 17/658,144, now issued U.S. Pat. No. 11,601,767, dated Apr. 6, 2022 through Nov. 14, 2022, 44 pp.

Notice of Intent to Grant and Text Intended to Grant from counterpart European Application No. 17199024.5 dated Dec. 21, 2023, 49 pp.

Response to Summons to Attend Oral Proceedings pursuant to Rule 115(1) EPC dated Oct. 19, 2023, including Main Request, from European Patent Application No. 17199024.5] filed Nov. 27, 2023, 34 pp.

Summons to Attend Oral Proceedings Pursuant to Rule 115(1) EPC from counterpart European Application No. 17199024.5 dated Oct. 19, 2023, 5 pp.

* cited by examiner

ANTENNA STRUCTURE FOR HEARING DEVICES

RELATED PATENT DOCUMENTS

This application is a continuation of U.S. patent application Ser. No. 17/658,144, filed Apr. 6, 2022, which is a continuation of U.S. patent application Ser. No. 16/675,691, filed Nov. 6, 2019, now issued as U.S. Pat. No. 11,323,833, which is a continuation of U.S. patent application Ser. No. 15/336,532, filed Oct. 27, 2016, now issued as U.S. patent Ser. No. 10,477,329, each of which are incorporated herein by reference in their entirety.

TECHNICAL FIELD

This application relates generally to hearing devices and to methods and systems related to such devices.

BACKGROUND

Hearing devices may include both prescriptive devices, also referred to as hearing aids, and non-prescriptive devices, also referred to as hearables. Examples of hearing devices include hearing aids, headphones, assisted listening devices, and earbuds. In some scenarios, information is communicated wirelessly between hearing devices and/or between a hearing device and an accessory device, such as a smartphone. The small size of hearing devices, particularly those designed to fit within the ear canal, leads to challenges in the design and placement of antennas for wireless communication.

SUMMARY

Some embodiments involve a hearing device that includes an antenna structure oriented such that a direction of an electric field (E-field) of a propagating electromagnetic signal generated by the antenna structure is directed non-tangentially with respect to the user at the location of the user's ear. The hearing device comprises an enclosure including a shell and a faceplate. The enclosure is configured for at least partial insertion within an ear of a user. The antenna structure includes an antenna disposed in or on the faceplate and a ground plane at least partially supported by the faceplate. A battery and electronic circuitry of the hearing device is disposed within the shell. The electronic circuitry is powered by the battery and electrically coupled to send and/or receive signals via the antenna structure.

According to some embodiments the antenna structure includes a planar antenna that extends along a plane of the faceplate, an electrically conductive ground plane that extends along the plane of the faceplate, and a dielectric disposed between the planar antenna and the ground plane.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Implementing wireless communications in a hearing device can be challenging, particularly for hearing devices wherein the electronic components are designed to fit within the ear canal of the user. Small hearing devices provide limited space for placement of the antenna for wireless communications. For example, the length of a 2.4 GHz quarter wave antenna in free space is approximately 31 mm, which is larger than the length of many hearing devices. In addition, placement within the ear causes head/body loading of the antenna leading to decreased efficiencies. Additional challenges arise because many hearing devices designed to fit within the hear canal are custom made for the individual user. The custom nature of these devices leads to variation in the placement of the antenna and/or other components. Inconsistent placement of the antenna relative to other components and/or structures of the hearing device can result in inconsistent performance of the wireless communication.

Some communication schemes involve communicating over ultrahigh frequencies (UHF), e.g., 300 MHz to 3 GHz. At some frequencies used for communication between hearing devices, e.g., the 2.4 GHz band, the user's head may present a significant load and penetration of a communication signal traveling through the user's head may be substantially attenuated. Thus, the main path for propagation of the wireless signal between the hearing devices at these frequencies is a creeping wave that follows the dielectric-air interface at the surface of the user's head. This communication path is enhanced when the direction of the electric field (E-field) of the wireless electromagnetic signal propagated from the antenna is predominantly oriented orthogonal to the surface of the user's body.

Embodiments disclosed herein are directed to hearing devices wherein the antenna structures are positioned so that the direction of the E-field of the wireless electromagnetic signal propagated from the antenna structures is non-tangential to the user at the location of the user's head. For example, the direction of the E-field may be substantially orthogonal to the user or at a significant angle, e.g., greater than 45 degrees, with respect to a line tangent to the user at the location of the user's head. Some approaches discussed herein facilitate consistent placement of antenna structures suitable for custom-made hearing devices.

Figure 1A:
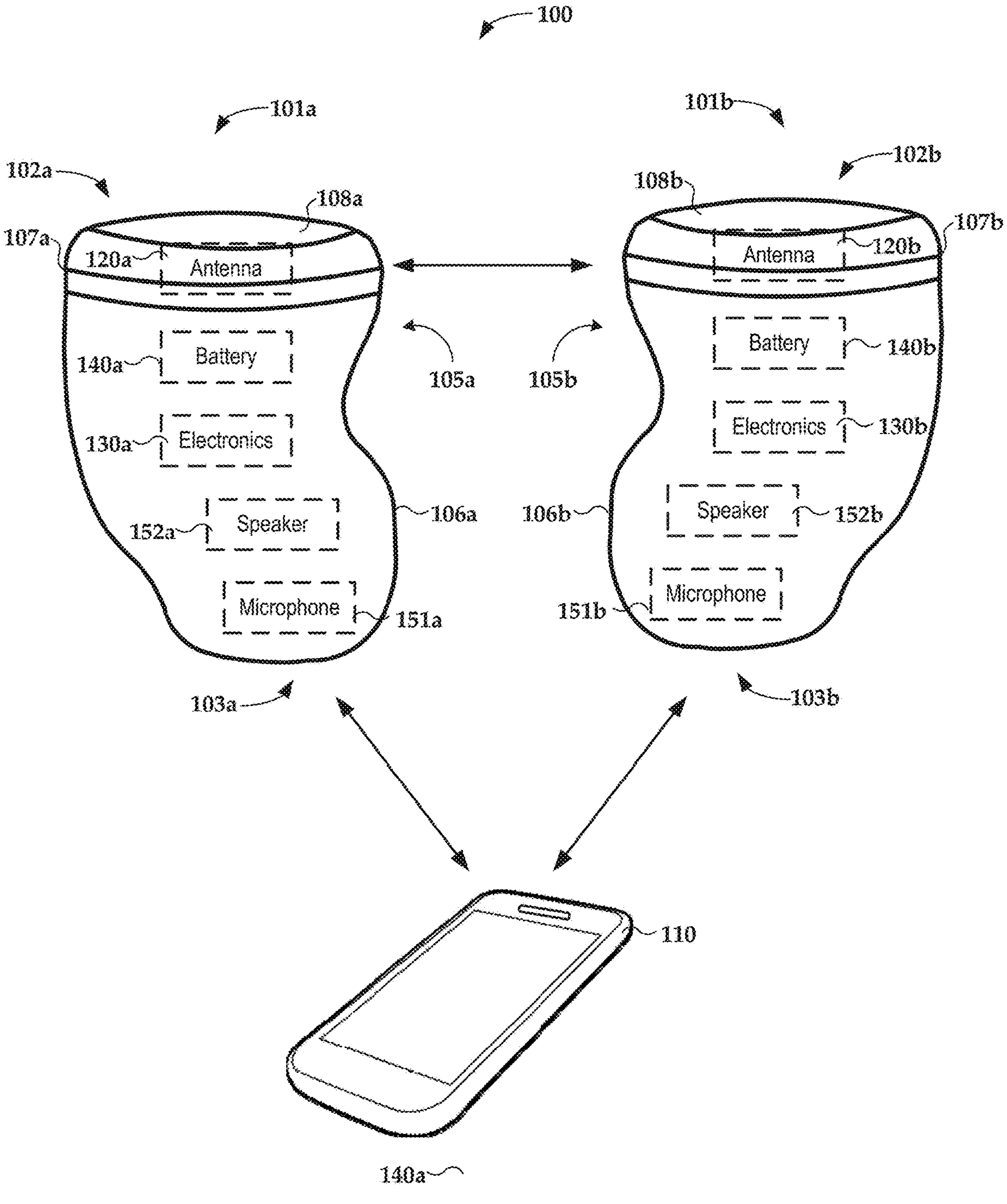
FIG. 1A is a diagram of a hearing system comprising left and right hearing devices that are configured to communicate wirelessly with each other and/or an accessory device in accordance with various embodiments.
Figure 1B:
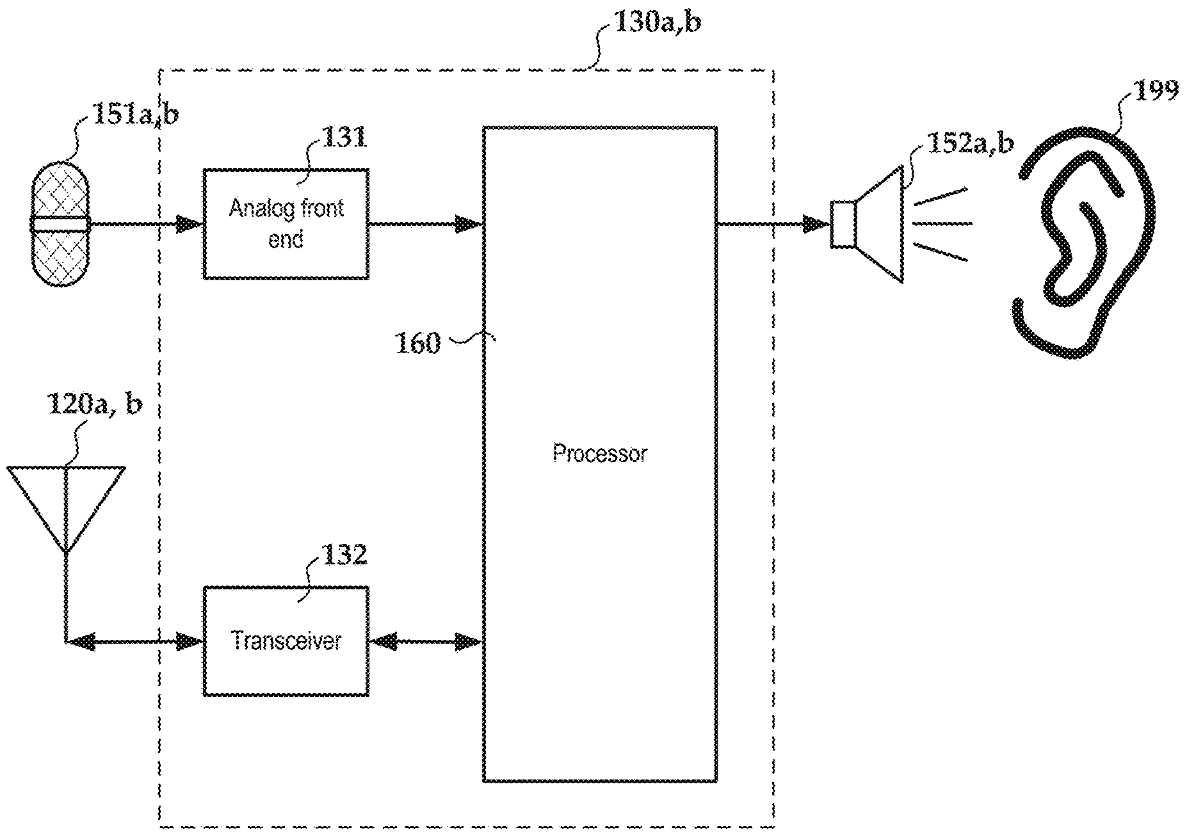
FIG. 1B is a block diagram showing components that may be disposed at least partially within the enclosure of a hearing device in accordance with some embodiments.

As conceptually illustrated in FIG. 1A, a hearing system 100 may include one or more hearing devices, e.g., left 101*a* and right 101*b* side hearing devices, configured to wirelessly communicate with each other. Some hearing systems may include an accessory device 110 that wirelessly communicates with one or both of the hearing devices 101*a*, 101*b*. FIG. 1A conceptually illustrates functional blocks of the hearing devices 101*a*, 101*b*. The position of the functional blocks in FIG. 1A does not necessarily indicate actual locations of components that implement these functional blocks within the hearing devices. FIG. 1B is a block diagram of components that may be disposed at least partially within the enclosure 105*a*, 105*b* of the hearing device 101*a*, 101*b*.

Each hearing device 101*a*, 101*b* includes a physical enclosure 105*a*, 105*b* that encloses an internal volume. The enclosure 105*a*, 105*b* is configured for at least partial insertion within the user's ear. The enclosure 105*a*, 105*b* includes an external side 102*a*, 102*b* that faces away from the user and an internal side 103*a*, 103*b* that is inserted in the ear canal. The enclosure 105*a*, 105*b* comprises a shell 106*a*, 106*b* and a faceplate 107*a*, 107*b*. The faceplate 107*a*, 107*b* may include a battery door 108*a*, 108*b* or drawer disposed near the external side 102*a*, 102*b* of the enclosure 105*a*, 105*b* and configured to allow the battery 140*a*, 140*b* to be inserted and removed from the enclosure 105*a*, 105*b*.

An antenna structure 120*a*, 120*b* is oriented such that a direction of the E-field of the electromagnetic signal generated by the antenna structure 120*a*, 120*b* is directed non-tangentially to the user's head at the location of the user's ear 199. As discussed in more detail herein, the antenna structure 120*a*, 120*b* includes an antenna disposed in or on the faceplate 107*a*, 107*b*, and a ground plane that may be at least partially supported by the faceplate 107*a*, 107*b*. It may be difficult or impossible for a customized hearing device to accommodate a quarter wavelength antenna structure.

The antenna structure 120*a,b* includes a matching circuit that compensates for a smaller size antenna which allows the antenna structure 120*a,b* to fit within a customized device, such as a device that fits partially or fully within the ear canal of a user. The matching circuit can be designed so that the power transfer from the transceiver 132 to the antenna structure 120*a,b*, provides a specified antenna efficiency, e.g., an optimal antenna efficiency for the customized environment.

The battery 140*a*, 140*b* powers electronic circuitry 130*a*, 130*b* that is also disposed within the shell 106*a*, 106*b*. As illustrated in FIGS. 1A and 1B, the hearing device 101*a*, 101*b* may include one or more microphones 151*a*, 151*b* configured to pick up acoustic signals and to transduce the acoustic signals into microphone electrical signals. The electrical signals generated by the microphones 151*a*, 151*b* may be conditioned by an analog front end 131 (see FIG. 1B) by filtering, amplifying and/or converting the microphone electrical signals from analog to digital signals so that the digital signals can be further processed and/or analyzed by the processor 160. The processor 160 may perform signal processing and/or control various tasks of the hearing device 101*a*, 101*b*. In some implementations, the processor 160 comprises a digital signal processor (DSP) that may include additional computational processing units operating in a multi-core architecture.

The processor 160 is configured to control wireless communication between the hearing devices 101*a*, 101*b* and/or accessory device 110 via the antenna structure 120*a*, 120*b*. The wireless communication may include, for example, audio streaming data and/or control signals. The electronic circuitry 130*a*, 130*b* of the hearing device 101*a*, 101*b* includes a transceiver 132. The transceiver 132 has a receiver portion that receives communication signals from the antenna structure 120*a*, 120*b*, demodulates the communication signals, and transfers the signals to the processor 160 for further processing. The transceiver 132 also includes a transmitter portion that modulates output signals from the processor 160 for transmission via the antenna structure 120*a*, 120*b*. Electrical signals from the microphone 151*a*, 151*b* and/or wireless communication received via the antenna 120*a*, 120*b* may be processed by the processor 160 and converted to acoustic signals played to the user via a speaker 152*a*, 152*b*.

Figure 2:
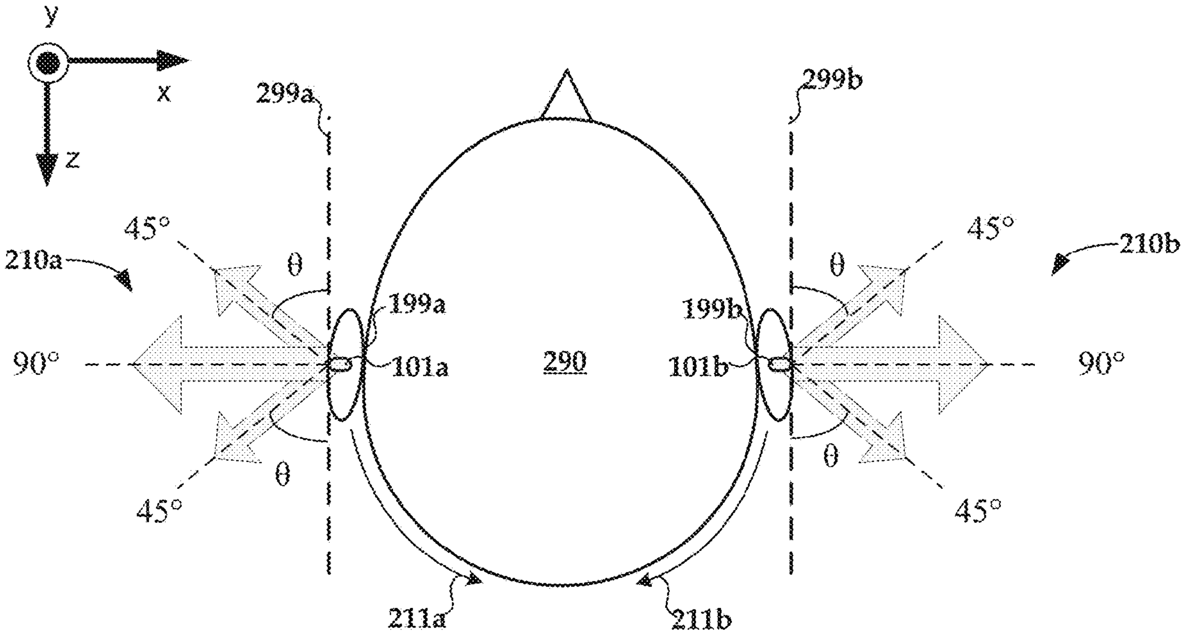
FIG. 2 shows the orientation of E-fields of electromagnetic signals generated by antenna structures of hearing devices in accordance with some embodiments.

FIG. 2 shows hearing devices 101*a*, 101*b* positioned at least partially within the ears 199*a*, 199*b* of a user 290. Possible directions of E-fields of electromagnetic signals generated by the antenna structures of hearing devices 101*a*, 101*b* relative to a user 290 are indicated by arrows 210*a*, 210*b* in FIG. 2. Dashed lines 299*a*, 299*b* are tangential to the user 290 at the location of the user's ears 199*a*, 199*b*. The antenna structure 120*a*, 120*b* of each hearing device 101*a*, 101*b* is arranged such that the direction of the E-field 210*a*, 210*b* of the electromagnetic signal produced by the antenna structure 120*a*, 120*b* is non-tangential to the head of the user 290 at the location of the user's ear 199*a*, 199*b*. In some embodiments, the antenna structure 120*a*, 120*b* may be oriented so that the direction of the E-field 210*a*, 210*b* makes an angle, θ, with respect to the tangent line 299*a*, 299*b*. For example, in some embodiments the antenna structure 120*a*, 120*b* may be oriented such that the direction of the E-field 210*a*, 210*b* may be substantially perpendicular to the tangent line 299*a* (θ is about equal to 90 degrees) or θ may be greater than about 45 degrees. The orientation of the antenna structure 120*a*, 120*b* enhances communication between the hearing devices 101*a*, 101*b*. For example, the communication between the hearing devices 101*a*, 101*b* may be predominantly due to propagation of creeping electromagnetic waves 211*a*, 211*b* that travel tangential to the user's body 290.

As discussed briefly above, an antenna structure 120*a*, 120*b* is appropriately sized with respect to the electromagnetic signal to be generated and/or received by the antenna. Each of the antenna and ground portions of the antenna structure 120*a*, 120*b* have an area that provides sufficient power in the transmitted and/or received signal. It can be helpful if mechanical and/or electromagnetic interference in the area utilized by the antenna structure 120*a*, 120*b* is reduced or eliminated. Furthermore, to reduce loading of the electromagnetic signal caused by the user's head, the antenna structure 120*a*, 120*b* may be located near the external surface 102*a*, 102*b* of the hearing device 101*a*, 101*b*.

Patch antennas, also referred to as rectangular microstrip antennas, are low profile and lightweight making them suitable for use in hearing devices. Although patch antennas may be three dimensional, they can be generally planar comprising a flat plate over a ground plane separated by a dielectric material. Patch antennas can be built on a printed circuit board where the antenna plate and ground plane are separated by the circuit board material which forms the dielectric. The planar inverted F antenna (PIFA) is a type of patch antenna that is particularly suited for hearing device applications. PIFA antennas are low profile, and have a generally omnidirectional radiation pattern in free space.

Figure 3A:
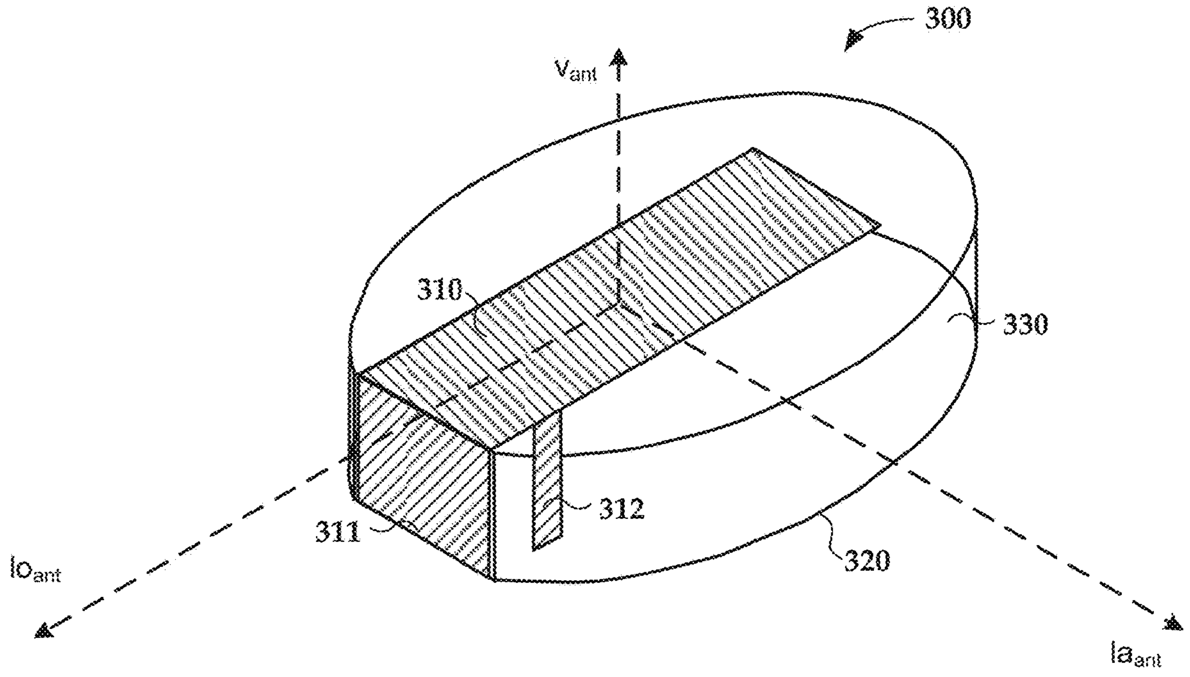
FIG. 3A illustrates a perspective view of a planar inverted F antenna structure that is suitable for use in hearing devices according to some embodiments.
Figure 3B:
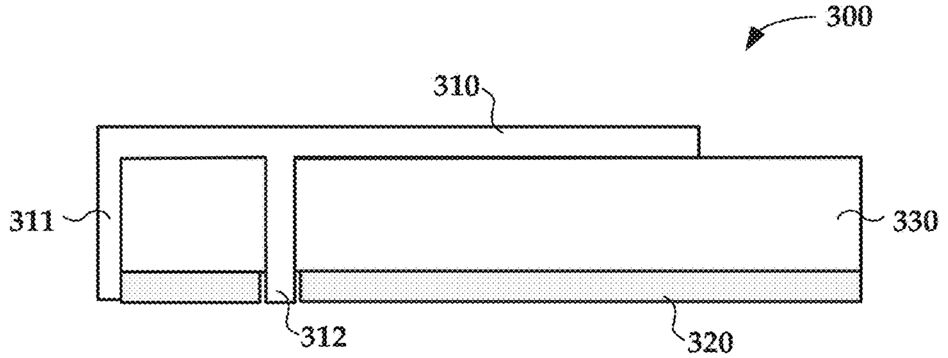
FIG. 3B illustrates a cross sectional view of the planar inverted F antenna structure of FIG. 3A.

FIGS. 3A and 3B show perspective and cross sectional views, respectively, of a patch antenna structure 300 that can be incorporated into hearing devices according to some embodiments. The patch antenna structure 300 includes a conductive patch antenna 310 and a ground plane 320 that overlaps and is spaced apart from the patch antenna 310. As illustrated in FIG. 3A, the patch antenna 310 extends along a longitudinal axis, $lo_{ant}$, and a lateral axis, $la_{ant}$, that is orthogonal to the axis $lo_{ant}$. The longitudinal and lateral axes define the plane of the patch antenna 310. A vertical axis, $v_{ant}$, is orthogonal to the plane of the patch antenna 310.

The ground plane 320 is separated from the conductive patch 310 by a dielectric 330. A shorting pin 311 shorts the patch antenna 310 to the ground plane 320. To achieve a desired antenna response, the antenna structure may include multiple shorting pins. The hearing device electronics 130*a,b* is coupled to the antenna 300 through the feed point 312. A suitable PCB material for the PIFA antenna dielectric 330 has an isotropic dielectric constant in a range of about 12 to about 13, such as the material TMM13i available from Rogers Corporation (www.rogerscorp.com). Materials with a dielectric constant in this range are useful to reduce the physical dimensions of the antenna structure when compared, for example, to the physical dimensions of an antenna structure that uses air as the dielectric.

Figure 4A:
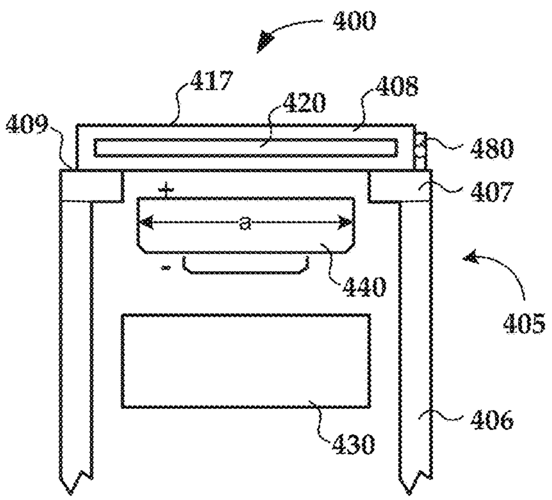
FIG. 4A is a diagram illustrating a hearing device that includes an antenna structure within the battery door of the faceplate in accordance with some embodiments.
Figure 4B:
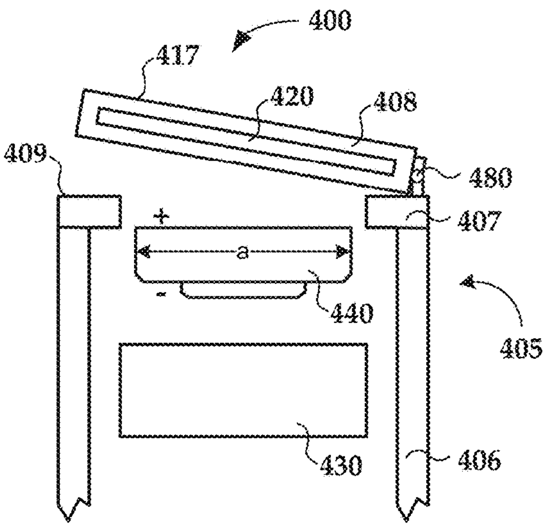
FIG. 4B is a diagram of the hearing device of FIG. 4A showing a hinged battery door that is partially open.
Figure 4C:
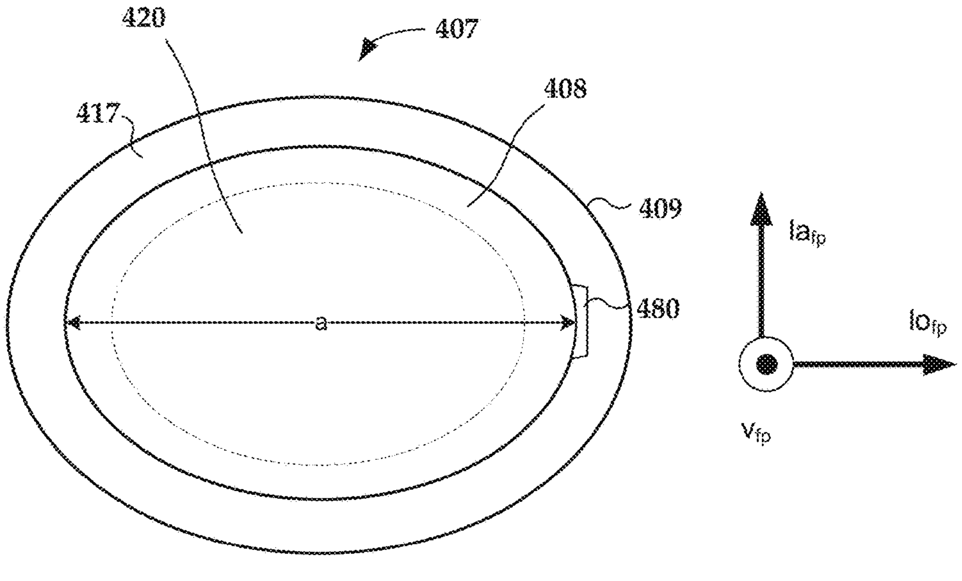
FIG. 4C is a top view of the battery door of the hearing device of FIG. 4A.

FIGS. 4A through 4C depict portions of a hearing device 400 including an enclosure 405 comprising a portion of a shell 406 and a faceplate 407. The faceplate 407 comprises a faceplate peripheral region 409 and a battery door 408. A battery 440 and electronics 430 is shown disposed within the shell 406. The battery 440 is accessible through the battery door 408. As illustrated in FIG. 4B, a hinge 480 connects the battery door 408 to the faceplate peripheral region 409 allowing the battery door 408 to rotate open or closed for accessing the battery 408.

FIG. 4C provides a top view of the faceplate 407 including the faceplate peripheral region 409, battery door 408, and hinge 480. As best seen in the top view of FIG. 4C, the faceplate 407 can be approximated by an ellipse or oval although other shapes are possible. The faceplate 407 extends generally along a longitudinal axis $lo_{fp}$ and a lateral axis $la_{f}$, where $lo_{fp}$ is the longest dimension of the faceplate 407 and $la_{fp}$ is orthogonal to $lo_{fp}$. Axes $lo_{fp}$ and $la_{fp}$ define the plane of the faceplate 407. The vertical axis, $v_{fp}$, of the faceplate extends through the faceplate and is orthogonal to $lo_{fp}$ and $la_{fp}$. The battery 440 may also be generally in the shape of an ellipse, oval or other suitable shape and may be oriented such a major surface of the battery lies substantially parallel to a plane formed by the longitudinal and lateral axes of the faceplate 407. In some embodiments, the ground (−) side of the battery 440 faces toward the user and the positive (+) side of the battery 440 faces away from the user (indicated in FIG. 4A). Alternatively, the battery may be arranged differently in the enclosure, e.g., in the opposite orientation or a major surface of the battery may be arranged substantially perpendicular to the plane of the faceplate.

As shown in FIGS. 4A through 4C, the antenna structure 420 can be disposed in or on the battery door 408 of the hearing device. For example, the antenna structure 420 may be molded within or on the battery door 408 or attached to a surface of the battery door 408, e.g., using an adhesive. In some embodiments, the antenna structure 420 and the battery door 408 may be formed as a unitary piece. For example, in some embodiments, the antenna structure 420 may be coated with a material that hardens over time or with exposure to certain stimuli, and the coated antenna structure serves as the battery door 408. As another example, the antenna structure 420 could be molded into the battery door 408 in some implementations.

When the battery 440 is arranged in the enclosure 405 such that the plane, a, of the battery 440 lies substantially along the plane of the faceplate 407, the battery door 408 provides a relatively large area for the antenna structure 420 at a location where mechanical interference from other structures and/or electromagnetic interference from the device electronics is reduced or eliminated. The hearing device 400 is configured to be inserted within the user's ear canal with the external surface 417 of the faceplate 407 facing away from the user. The faceplate 407 may extend out of the ear canal or be located close to the opening of the ear canal. Locating the antenna structure 420 in, on, or near the faceplate 407 serves to reduce loading of the electromagnetic signal caused by the user's head. In the arrangements shown in FIGS. 4A through 4C, the battery 440 may provide a shield for the antenna structure 420. The shield provided by the battery may achieve further reduction in electromagnetic interference generated by the hearing device electronics 430 that may affect signals on the antenna 420.

The antenna structure 420 can be arranged such that the plane of the antenna extends along the plane of the faceplate 407. In some embodiments, the plane of the antenna structure 420 may be substantially parallel or at a slight angle with the plane of the faceplate 407. The antenna structure 420 may comprise a PIFA as illustrated in connection with FIGS. 3A and 3B. When a PIFA is used, the patch antenna 310 and ground plane 320 may be arranged to extend along the plane of the faceplate 407.

A prototype hearing device that incorporated the PIFA antenna shown generally in FIGS. 3A and 3B was constructed and tested. The initial prototype provided radiation efficiencies from the antenna structure without head loss at about −6 dB with a footprint of about the size of a 13 or 312 battery, e.g., about 8 mm in diameter. The total radiated power (TRP) of the prototype PIFA was about −16 dBm.

Figure 5A:
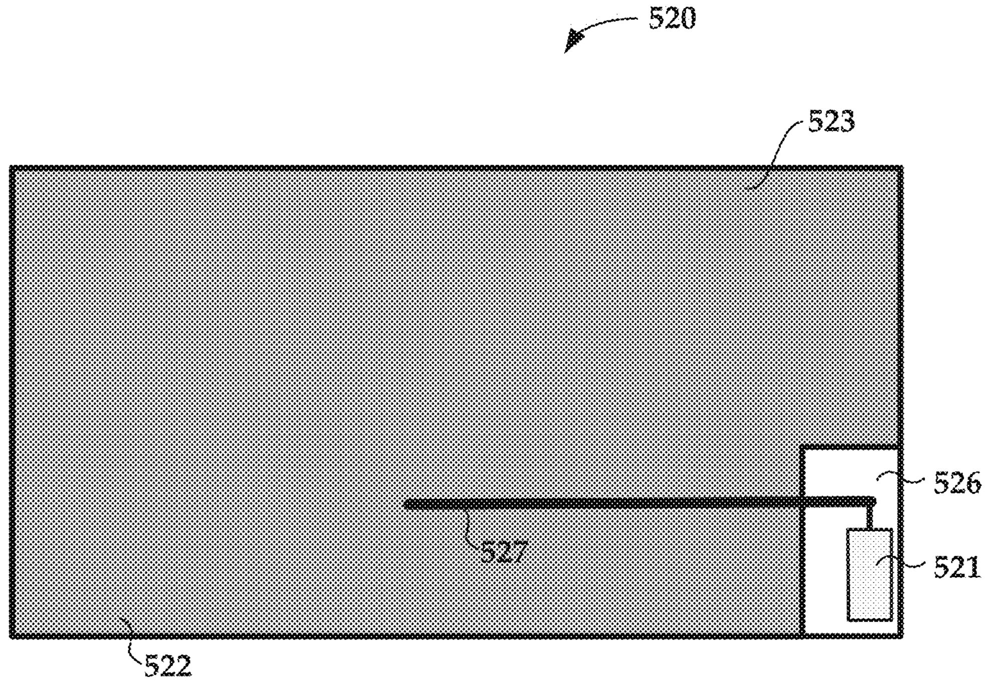
FIG. 5A illustrates a top view of a chip antenna structure that is suitable for use in hearing devices according to some embodiments.
Figure 5B:
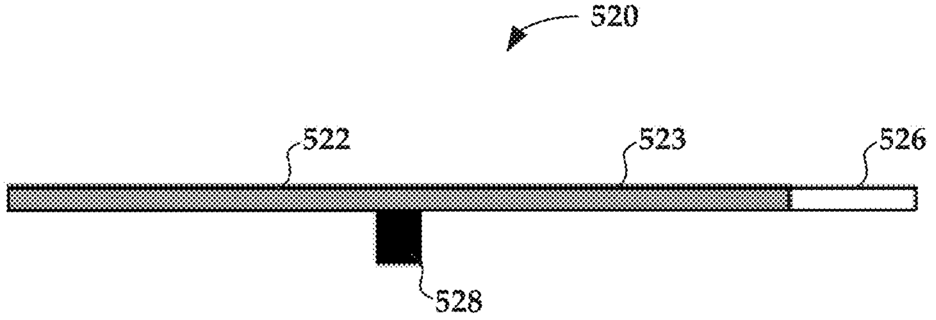
FIG. 5B illustrates a cross sectional view of the chip antenna structure of FIG. 53A;]

An antenna structure comprising a chip antenna is also suitable for hearing device applications. The chip antenna can be soldered to a two dimensional printed circuit board (PCB) that provides a ground plane which is large relative to the hearing device. FIGS. 5A and 5B show a top view and a cross sectional view of an example antenna structure 520 comprising a chip antenna 521 and ground plane 522. The function of the ground plane is to create an "image" of the chip antenna to collect energy from the environment at the frequency of interest. Consequently, the size of the PCB used for chip antennas is normally related to a quarter wavelength at the frequency of interest. In this example, the frequency of interest is about 2450 MHz and a quarter wavelength in free space is about 30 mm.

In a custom hearing device, the ground plane 522 may not be able accommodate the full size of a quarter-wavelength in free space for UHF. The antenna structure 520 as shown in the diagrams of FIG. 5A and FIG. 5B includes a chip antenna 521 that provides a relatively small size antenna element. The chip antenna 521 is used with a ground plane 522 that is smaller than the quarter wavelength at the frequency of interest. As previously discussed, the antenna structure 520 includes a matching circuit designed for the environment of the customized hearing device. The matching circuit is configured to provide a specified power transfer between the transceiver (see FIG. 1B) and the chip antenna 521, resulting in a desired antenna efficiency. As illustrated in FIG. 5, the antenna structure 520 includes an antenna clearance area 526 on the PCB 523. A transmission line 527, e.g., 50 ohms transmission line, extends across the ground plane 522 to the feed point 528 of the chip antenna 521.

The nature of hearing devices that are custom-made for particular users makes it difficult to accommodate requirements related to the consistent placement of the components of the hearing devices, e.g., antenna, battery, microphone, speaker, and electronics. It can be challenging to consistently place components in the same position from one device to the next. In addition, the custom nature of the hearing device creates randomness in the environment of the antenna from device to device. The hardware components of the hearing device (battery, microphone, electronics, etc.) may all be in close proximity to the antenna structure. If placement is not accurate, the surrounding components may affect transmission and/or reception quality of the antenna. Embodiments disclosed herein relate to the design of a custom hearing device that reduces inconsistencies in the placement and performance of the antenna structure.

Figure 6A:
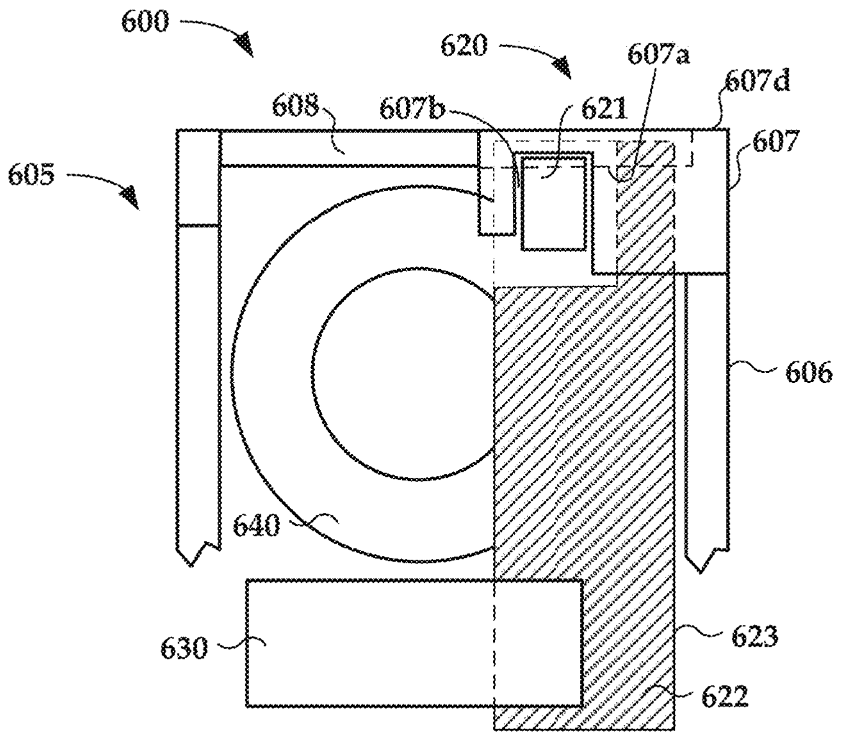
FIG. 6A is a diagram illustrating a hearing device that includes a chip antenna structure disposed within a pocket in an internal side of the faceplate in accordance with some embodiments.
Figure 6B:
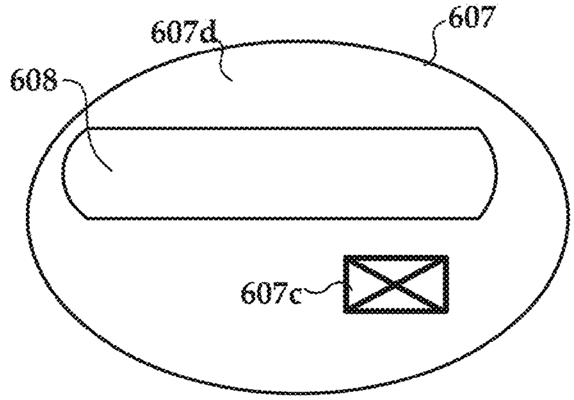
FIG. 6B is a top view of the faceplate of the hearing device of FIG. 6A.

FIGS. 6A and 6B schematically illustrate a portion of a hearing device 600 that includes an enclosure 605 with electronics 630, a battery 640, and an antenna structure 620 disposed within the enclosure 605. FIG. 6A provides a cross sectional view of the hearing device 600 showing a portion of the shell 606 and faceplate 607. The battery 640 is disposed within the shell 606 and can be accessed via a battery door 608 of the faceplate 607. FIG. 6B shows a top view of the faceplate 607, also showing the external surface of the battery door 608.

The antenna structure 620 is oriented such that the E-field of an electromagnetic signal propagated from the antenna structure 620 is non-tangential to the user at the location of the user's ear. For example, in some arrangements the E-field may be substantially orthogonal to the user at the location of the user's ear or at a significant angle, e.g., 45 degrees or greater with respect to the tangent. The antenna structure 620 may comprise the chip antenna structure 500 as previously illustrated and described with reference to FIGS. 5A through 5B.

The faceplate 607 may be configured such that the battery 640, microphone (not shown in FIGS. 6A and 6B), antenna structure 620, and/or other components of the hearing device 600 can be placed consistently from one device to the next. As shown in FIG. 6A, in some embodiments, the internal side 607*a* of the faceplate 607 may include a feature 607*b* that facilitates placement of the chip antenna 621 relative to the faceplate 607 and/or other components of the hearing device 600. The feature 607*b* may be disposed in or on the internal side of the faceplate. For example, the internal side 607*a* of the faceplate 607 may include a pocket 607*b* dimensioned to receive at least a portion of the chip antenna 621. The pocket 607*b* in the faceplate 607 provides for more consistent placement and orientation of the antenna structure 620 from device to device. The pocket 607*b* can be molded into the plastic of the faceplate 607 to guide the technician to where the chip antenna 621 should be placed.

As shown in FIG. 6A, the PCB 623 that includes the ground plane 622 is supported by the faceplate 607. In some embodiments the PCB 623 may also support components of the device electronics 630, such as a DSP, transceiver, and/or analog front end. The chip antenna 621 may be attached to the PCB 623 at surface mount assembly stage and then glued into its place on the faceplate 607. Alternatively, the chip antenna 621 may be molded or glued into the faceplate 607 first and then hand soldered to the PCB 623 at the faceplate assembly stage. In the configuration shown in FIGS. 6A and 6B, the battery 640 may also be used as part of the ground plane of the antenna structure 620 to enhance transmission quality.

The faceplate described in connection with FIGS. 6A and 6B allows for enhanced consistency in antenna placement achieved by mounting the antenna 621 relative to a feature of the faceplate, such as a pocket or other feature. Additionally, the use of a chip antenna structure makes for easier manufacturing by implementing the chip antenna 621 on the PCB assembly 623. Assembly costs may be reduced because the chip antenna 621 can be assembled to the PCB assembly 623 using an automated placement machine and the technician has a designated place to place the chip antenna 621. The placement of the chip antenna 621 in the faceplate 607 results in the chip antenna 621 positioned toward the outside of the ear. In some embodiments, the faceplate 607 includes a second feature 607*c* on the external side 607*d* of the faceplate 607. The second feature 607*c* may be a molded or printed feature, for example. The second feature 607*c* indicates the position of the pocket 607*b* to further assist the assembly technician with placement of the chip antenna 621.

Embodiments discussed herein include:

Embodiment 1

A hearing device comprising:

an enclosure configured for at least partial insertion within an ear of a user, the enclosure comprising a shell and a faceplate;

an antenna structure oriented such that a direction of an electric field (E-field) of a propagating electromagnetic signal generated by the antenna structure is directed non-tangentially with respect to the user at the location of the user's ear, the antenna structure comprising:

an antenna disposed in or on the faceplate; and a ground plane at least partially supported by the faceplate;

a battery; and electronic circuitry disposed within the shell, the electronic circuitry powered by the battery and electrically coupled to send and/or receive signals via the antenna structure.

Embodiment 2

The hearing device of embodiment 1, wherein the antenna structure comprises an electrically conductive patch disposed on a substrate, a longitudinal surface of the patch extending along a plane of the faceplate.

Embodiment 3

The hearing device of embodiment 2, wherein a longitudinal surface of the ground plane extends along the plane of the faceplate and is spaced apart from and overlaps the patch.

Embodiment 4

The hearing device of any of embodiments 1 through 3, wherein the antenna structure comprises:

a substrate comprising a dielectric material;

the antenna comprises a patch antenna disposed on a first surface of the substrate; and the ground plane comprises an electrically conductive plane disposed on a second surface of the substrate, the patch antenna and the ground plane separated by the dielectric material of the substrate.

Embodiment 5

The hearing device of any of embodiments 1 through 4, wherein:

the faceplate includes a battery door configured to allow the battery to be inserted into and removed from the hearing device; and the antenna structure is disposed in or on the battery door.

Embodiment 6

The hearing device of embodiment 5, wherein a major surface of the battery extends along a plane of the faceplate.

Embodiment 7

The hearing device of embodiment 5, wherein a major surface of the battery is oriented substantially perpendicular to a plane of the faceplate.

Embodiment 8

The hearing device of any of embodiments 1 through 7, wherein the antenna is a chip antenna.

Embodiment 9

The hearing device of embodiment 8, wherein the ground plane is disposed on a circuit board that extends within the shell.

Embodiment 10

The hearing device of embodiment 8, wherein the faceplate includes a peripheral region and a battery door and the antenna is disposed in or on the peripheral region of the faceplate.

Embodiment 11

The hearing device of embodiment 8, wherein the antenna is molded or glued to the faceplate.

Embodiment 12

The hearing device of embodiment 8, wherein the faceplate includes a feature that indicates a position of the antenna relative to the faceplate.

Embodiment 13

The hearing device of embodiment 12, wherein the faceplate includes a pocket dimensioned to receive at least a portion of the antenna.

Embodiment 14

The hearing device of any of embodiments 1 through 13, wherein the antenna structure is configured to operate in a frequency range of about 300 MHz to about 3 GHz.

Embodiment 15

The hearing device of any of embodiments 1 through 14, wherein the E-field is substantially orthogonal to a line tangent to the user at the user's ear.

Embodiment 16

A hearing device comprising:

an enclosure configured for at least partial insertion within an ear of a user, the enclosure comprising a shell and a faceplate;

an antenna structure oriented such that a direction of an electric field (E-field) of a propagating electromagnetic signal generated by the antenna structure is directed non-tangentially with respect to the user at the location of the antenna structure, the antenna structure comprising:

a planar antenna that extends along a plane of the faceplate;

an electrically conductive ground plane that extends along the plane of the faceplate; and a dielectric disposed between the planar antenna and the ground plane; a battery; and electronic circuitry disposed within the shell, the electronic circuitry powered by the battery and electrically coupled to send and/or receive signals via the antenna structure.

Embodiment 17

The hearing device of embodiment 16, wherein:

the faceplate comprises a battery door configured to allow the battery to be inserted into and removed from the hearing device; and the antenna structure is disposed in or on the battery door.

Embodiment 18

The hearing device of embodiment 17, wherein the antenna structure and the battery door are a unitary component.

Embodiment 19

The hearing device of embodiment 18, wherein the battery door is attached to a peripheral region of the faceplate by a hinge.

Embodiment 20

The hearing device of any of embodiments 16 through 19, wherein the patch antenna and the ground plane are electrically connected at one or more locations.

It is understood that the embodiments described herein may be used with any hearing device without departing from the scope of this disclosure. The devices depicted in the figures are intended to demonstrate the subject matter, but not in a limited, exhaustive, or exclusive sense. It is also understood that the present subject matter can be used with a device designed for use in the right ear or the left ear or both ears of the wearer.

It is understood that the hearing devices referenced in this patent application may include one or more processors. The processors may include a digital signal processor (DSP), microprocessor, microcontroller, other digital logic, or combinations thereof. The processing of signals referenced in this application can be performed using a processor. Processing may be done in the digital domain, the analog domain, or combinations thereof. Processing may be done using subband processing techniques. Processing may be done with frequency domain or time domain approaches. Some processing may involve both frequency and time domain aspects. For brevity, in some examples drawings may omit certain blocks that perform frequency synthesis, frequency analysis, frequency transposition, analog-to-digital conversion, digital-to-analog conversion, amplification, audio decoding, and certain types of filtering and processing. In various embodiments the processor is adapted to perform instructions stored in memory which may or may not be explicitly shown. Various types of memory may be used, including volatile and nonvolatile forms of memory. In various embodiments, instructions are performed by the processor to implement a number of signal processing tasks. In such embodiments, analog components are in communication with the processor to perform signal tasks, such as microphone reception, or receiver sound embodiments (e.g., in applications where such transducers are used). In various embodiments, different realizations of the block diagrams, circuits, and processes set forth herein may occur without departing from the scope of the present subject matter.

The present subject matter is demonstrated for hearing devices, including hearables, hearing assistance devices, and/or hearing aids, including but not limited to, in-the-ear (ITE), in-the-canal (ITC), or completely-in-the-canal (CIC) type hearing devices. It is understood that behind-the-ear type hearing devices may include devices that reside substantially behind the ear or over the ear. The present subject matter can also be used in cochlear implant type hearing devices such as deep insertion devices having a transducer, such as a receiver or microphone, whether custom fitted, standard, open fitted or occlusive fitted. It is understood that other hearing devices not expressly stated herein may be used in conjunction with the present subject matter.

Although the subject matter has been described in language specific to structural features and/or methodological acts, it is to be understood that the subject matter defined in the appended claims is not necessarily limited to the specific features or acts described above. Rather, the specific features and acts described above are disclosed as representative forms of implementing the claims.

The invention claimed is:

1. A hearing device, comprising:
- an enclosure configured for at least partial insertion within an ear of a user, the enclosure comprising a shell and a faceplate;
- an antenna structure disposed in or on the faceplate, the antenna structure comprising:
  - a substrate comprising a dielectric material;
  - an electrically conductive patch disposed on a first surface of the substrate; and
  - a ground plane comprising an electrically conductive plane disposed on a second surface of the substrate opposing the first surface, the ground plane separated from the electrically conductive patch by the dielectric material of the substrate, and the electrically conductive patch and the ground plane are electrically connected at one or more locations; and
- electronic circuitry disposed within the shell, the electronic circuitry being electrically coupled to send and/or receive signals via the antenna structure.

2. The hearing device of claim 1, wherein the first and second surfaces extend along a plane of the faceplate.

3. The hearing device of claim 2, wherein the ground plane is spaced apart from and overlaps the patch.

4. The hearing device of claim 1, wherein:
- the faceplate includes a battery door configured to allow a battery to be inserted into and removed from the hearing device; and
- the antenna structure is disposed in or on the battery door.

5. The hearing device of claim 1, wherein the dielectric material has an isotropic dielectric constant in a range of about 12 to about 13.

6. The hearing device of claim 1, wherein the antenna structure is configured to operate at a frequency of interest within a frequency range of about 300 MHz to about 3 GHz.

7. The hearing device of claim 1, wherein an E-field of a propagating electromagnetic signal generated by the antenna structure is substantially orthogonal to a line tangent to the user at the ear of the user.

8. The hearing device of claim 1, wherein:
- the faceplate comprises a battery door; and
- the battery door is the antenna structure.

9. A hearing device comprising:
- an enclosure configured for at least partial insertion within an ear of a user, the enclosure comprising a shell and a faceplate,
- wherein the faceplate defines a pocket having an opening disposed in an internal surface of the faceplate, the pocket and opening dimensioned to receive a chip antenna and configured to guide placement of the chip antenna; and
- a location feature disposed on an external surface of the faceplate that indicates a position of the pocket;
- an antenna structure comprising:
  - the chip antenna disposed in the pocket; and
  - a ground plane at least partially supported by the faceplate; and
- electronic circuitry disposed within the shell, the electronic circuitry electrically coupled to send and/or receive signals via the antenna structure.

10. The hearing device of claim 9, wherein the ground plane is disposed on a circuit board that extends within the shell.

11. The hearing device of claim 9, wherein:
- the faceplate includes a peripheral region and a battery door; and
- the chip antenna is disposed in or on the peripheral region of the faceplate.

12. The hearing device of claim 9, wherein the chip antenna is molded or glued to the faceplate.

13. A hearing device comprising:
- an enclosure configured for at least partial insertion within an ear of a user, the enclosure comprising a shell and a faceplate;
- an antenna structure comprising:
  - a substrate comprising a dielectric material;
  - a planar antenna that extends along a plane of the faceplate disposed on a first surface of the substrate; and
  - an electrically conductive ground plane that extends along the plane of the faceplate, the electrically conductive ground plane disposed on a second surface of the substrate opposite the first surface such that the electrically conductive ground plane fully or partially overlaps the planar antenna and the dielectric material of the substrate is disposed between the planar antenna and the electrically conductive ground plane and the planar antenna and the electrically conductive ground plane are electrically connected at one or more locations; and electronic circuitry disposed within the shell, the electronic circuitry being electrically coupled to send and/or receive signals via the antenna structure.

14. The hearing device of claim 13, wherein:

the faceplate comprises a battery door configured to allow a battery to be inserted into and removed from the hearing device; and the antenna structure is disposed in or on the battery door.

15. The hearing device of claim 14, wherein the antenna structure and the battery door are a unitary component.

16. The hearing device of claim 14, wherein the battery door is attached to a peripheral region of the faceplate by a hinge.

17. The hearing device of claim 13, wherein the antenna structure has a diameter of about 8 mm.

* * * * *